(12) United States Patent
Choi et al.

(10) Patent No.: US 12,440,433 B2
(45) Date of Patent: Oct. 14, 2025

(54) BRIGHTENING COSMETIC COMPOSITION COMPRISING SODIUM PYRUVATE AS ACTIVE INGREDIENT

(71) Applicants: LG HOUSEHOLD & HEALTH CARE LTD., Seoul (KR); TAI GUK PHARM. IND. CO., LTD., Chungcheongnam-do (KR)

(72) Inventors: Seon Guk Choi, Seoul (KR); Oun Young Lee, Seoul (KR); Jin Hyun Kim, Seoul (KR); Jun Mun Lee, Seoul (KR); Nae Gyu Kang, Seoul (KR); Seong Heon Hong, Seoul (KR); Seo Hun Roh, Chungcheongnam-do (KR)

(73) Assignees: LG HOUSEHOLD & HEALTH CARE LTD., Seoul (KR); TAI GUK PHARM. IND. CO., LTD., Chungcheongnam-go (KR)

( * ) Notice: Subject to any disclaimer, the term of this patent is extended or adjusted under 35 U.S.C. 154(b) by 253 days.

(21) Appl. No.: 18/007,390

(22) PCT Filed: Jul. 29, 2021

(86) PCT No.: PCT/KR2021/009856
§ 371 (c)(1),
(2) Date: Jan. 30, 2023

(87) PCT Pub. No.: WO2022/025656
PCT Pub. Date: Feb. 3, 2022

(65) Prior Publication Data
US 2023/0270640 A1    Aug. 31, 2023

(30) Foreign Application Priority Data
Jul. 30, 2020 (KR) .................. 10-2020-0095328

(51) Int. Cl.
*A61K 8/365* (2006.01)
*A61K 8/42* (2006.01)
(Continued)

(52) U.S. Cl.
CPC ............. *A61K 8/365* (2013.01); *A61K 8/42* (2013.01); *A61K 31/17* (2013.01); *A61K 31/19* (2013.01);
(Continued)

(58) Field of Classification Search
None
See application file for complete search history.

(56) References Cited

U.S. PATENT DOCUMENTS

| 5,646,190 A * | 7/1997 | Martin | A61K 31/20 |
| | | | 514/724 |
| 2004/0033963 A1 | 2/2004 | Yu et al. | |
| 2006/0269504 A1 * | 11/2006 | James | A61K 8/38 |
| | | | 514/718 |

FOREIGN PATENT DOCUMENTS

| CN | 107260652 A | 10/2017 |
| DE | 69432149 T2 | 7/2003 |

(Continued)

OTHER PUBLICATIONS

JP2016/041669A—Google English Translation (Year: 2016).*
(Continued)

*Primary Examiner* — Kyung S Chang
(74) *Attorney, Agent, or Firm* — Vorys, Sater, Seymour and Pease LLP; Mih Suhn Koh

(57) ABSTRACT

Provided is a brightening use of a composition including sodium pyruvate and one or more selected from the group consisting of urea and hydroxyethyl urea. Since the composition exhibits a synergistic brightening effect, even when a low concentration of sodium pyruvate is included, a (Continued)

HEU* : Hydroxyethyl urea
SP* : Sodium pyruvate brightening effect at the same level as when a high concentration of sodium pyruvate is used can be obtained. Therefore, the composition can be effectively applied in cosmetics, medicines, external preparations, and the like.

6 Claims, 1 Drawing Sheet

(51) Int. Cl.
    *A61K 31/17* (2006.01)
    *A61K 31/19* (2006.01)
    *A61K 31/22* (2006.01)
    *A61P 17/00* (2006.01)
    *A61Q 19/00* (2006.01)
    *A61Q 19/02* (2006.01)
    *A61Q 19/08* (2006.01)
    *A61Q 19/10* (2006.01)

(52) U.S. Cl.
    CPC ...... *A61Q 19/02* (2013.01); *A61K 2800/5922* (2013.01)

(56) References Cited

FOREIGN PATENT DOCUMENTS

| | | |
|---|---|---|
| JP | 03-11010 A | 1/1991 |
| JP | 6-199646 A | 7/1994 |
| JP | 9-315928 A | 12/1997 |
| JP | 2684561 B2 | 12/1997 |
| JP | 10-120545 A | 5/1998 |
| JP | 2003-26528 A | 1/2003 |
| JP | 2014-511423 A | 5/2014 |
| JP | 2016-41669 A | 3/2016 |
| KR | 10-2013-0061950 A | 6/2013 |
| KR | 10-2015-0085546 A | 7/2015 |
| KR | 10-2017-0038581 A | 4/2017 |
| KR | 10-2018-0123717 A | 11/2018 |

OTHER PUBLICATIONS

JPH0311010A—Google English Translation (Year: 1991).*
The Chinese Office Action for corresponding CN Appl No. 202180059291.X, mailed Aug. 1, 2023, 3 pages.
The JP Office Action for corresponding JP 2023-506327, issued Nov. 27, 2023, three pages.

* cited by examiner

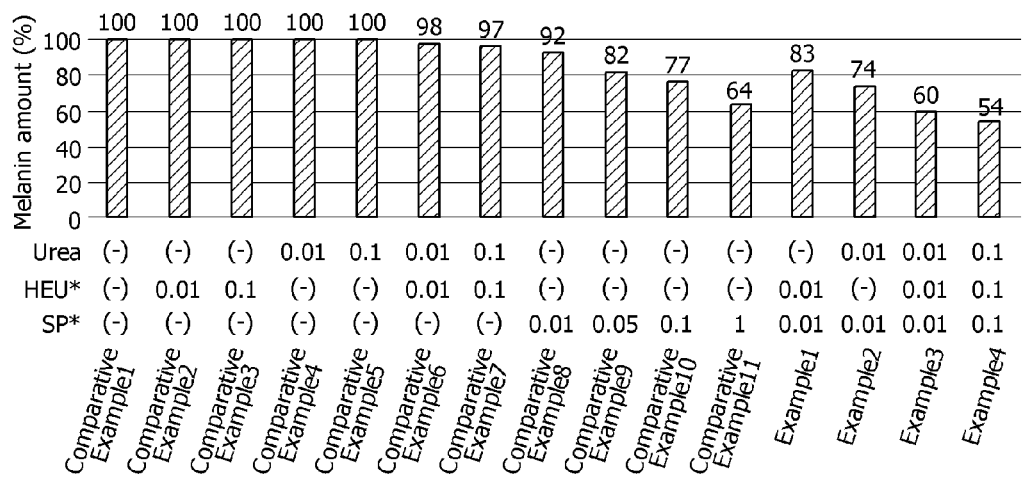

BRIGHTENING COSMETIC COMPOSITION COMPRISING SODIUM PYRUVATE AS ACTIVE INGREDIENT

TECHNICAL FIELD

The present invention relates to a brightening cosmetic composition comprising sodium pyruvate and one or more selected from the group consisting of urea and hydroxyethyl urea.

BACKGROUND ART

Skin color is determined by melanin, hemoglobin, carotenes, and the like. Among them, melanin plays the most important role. In addition to determining human skin color, melanin also performs skin protection functions such as ultraviolet ray absorption, a free radical scavenger, and the like. However, when melanin is excessively produced due to external environmental changes such as excessive exposure to ultraviolet rays, air pollution, stress, and the like, pigmentation occurs in the skin and thus causes melanism, melasma, freckles, or the like. Melanism is caused by the reaction of cutaneous cells with respect to internal and external factors, and a representative factor is exposure to ultraviolet rays. In other words, when the skin is exposed to ultraviolet rays, tyrosinase is activated, and an oxidation process, in which the tyrosinase acts on tyrosine present in cutaneous tissues to produce DOPA and dopaquinone, results in the synthesis of a polymer called melanin in melanosomes in melanocytes which are skin pigment cells. The synthesized melanin is transferred to keratinocytes, which are skin keratin-producing cells, reaches the skin surface by a keratinization process, and thus protects the skin from ultraviolet rays. However, when melanin is locally excessively synthesized or when the physiological function of the skin is deteriorated due to skin lesions and aging, melanin is deposited on the skin surface to cause melasma, freckles, and various types of pigmentation.

Meanwhile, human skin stores melanoblasts in the follicular epithelium, particularly, the bulge, and when melanocytes are detached from the basal layer of interfollicular epidermis, melanoblasts migrate to this part. In this case, melanogenesis and dendrite outgrowth required in migration of melanin granules to keratinocytes occur due to not only ultraviolet rays but also interactions between adjacent cutaneous cells such as keratinocytes, fibroblasts, or inflammatory cells, and terminal differentiation proceeds. Typically, α-melanocyte-stimulating hormone (MSH), which is a melanocyte differentiation promoting material secreted from keratinocytes exposed to UV, promotes the proliferation of melanoblasts and increases the expression of the M promoter of the microphthalmia-associated transcription factor (MITF) in melanocytes to increase the expression of enzymes that cause pigment formation, such as tyrosinase, and causes melanosome formation and dendrite elongation. As such, the molecular mechanism related to the differentiation of melanocytes is elaborately regulated.

As the cause and mechanism of skin melanism have been clarified as described above, a method of reducing the production of melanin by blending substances having an effect of inhibiting the activity of tyrosinase that is an enzyme involved in the skin melanism process or by inhibiting some reactions in a melanogenesis process in preparation of brightening cosmetics or medical compositions for pigmentation improvement has been generally used. Representative substances used for this purpose comprise chemical substances such as ascorbic acid, kojic acid, hydroquinone, sodium pyruvate, and the like and plant extracts such as a mulberry root extract, a glycyrrhiza extract, and the like. However, ascorbic acid is not suitable as a melanogenesis inhibitor due to having not only an insufficient tyrosinase activity inhibitory effect but also low safety of the molecule itself, kojic acid has stability problems such as discoloration when blended into cosmetics and a decrease in titer over time and has a limitation in use due to high skin irritation despite having excellent tyrosinase inhibitory activity, and the use of hydroquinone is also limited in cosmetics due to skin irritation and safety problems and its content is limited to less than 4% in general medicines.

Accordingly, attention has been focused on sodium pyruvate as a new substance for inhibiting melanogenesis. However, when used in thickener-containing formulations such as a cosmetic and the like, sodium pyruvate causes the collapse of a thickening system, and thus a high content of thickener needs to be further used. Specifically, the thickening system is formed by neutralizing the backbone of a polymer thickener such as Carbopol present in the form of a random coil with an alkali substance in an aqueous solution and extending the same, and when the thickener backbone is recoiled in the form of a random coil due to sodium salt dissociated from a high concentration of sodium pyruvate, the thickening system collapses, and accordingly, coalescence and phase separation of emulsified particles occur, leading to a decrease in viscosity and hardness. Accordingly, other ingredients that increase viscosity and hardness need to be comprised, and if so, the feeling of use of products, such as stickiness, heavy feeling of use, difficulty in realizing smooth spreadability, or the like, is degraded. Therefore, it is necessary to use sodium pyruvate itself within a range that does not lower the viscosity and hardness of a formulation, and if so, a sufficient brightening effect caused by sodium pyruvate cannot be achieved.

Under this background, attention has been focused on the development of a brightening ingredient having excellent brightening activity even at a low dose of sodium pyruvate.

DISCLOSURE

Technical Problem

As a result of extensive research efforts to accomplish the above objective, the inventors of the present invention have found that, when a low concentration of sodium pyruvate is used along with one or more of hydroxyethyl urea and urea, a brightening effect is remarkably increased, and thus a brightening effect at the same level as when a high concentration of sodium pyruvate is used is exhibited. Based on the fact, the present invention has been completed.

The present invention is directed to providing a brightening cosmetic composition having excellent skin brightening efficacy.

The present invention is also directed to providing a brightening cosmetic composition, a pharmaceutical composition for treating pigmentation, and a brightening composition for an external preparation for skin, which comprise sodium pyruvate and one or more selected from the group consisting of urea and hydroxyethyl urea; a brightening method and a pigmentation treatment method, which use the composition; and a use of the composition to prepare a brightening cosmetic and a use of the composition to prepare a therapeutic agent for pigmentation.

Technical Solution

One aspect of the present invention provides a brightening cosmetic composition which comprises sodium pyruvate and one or more selected from the group consisting of urea and hydroxyethyl urea.

The cosmetic composition in the present invention may be in a formulation such as a toner, an essence, a lotion, a cream, a pack, a gel, a powder, a foundation, or a cleanser.

Another aspect of the present invention provides a pharmaceutical composition for treating pigmentation, which comprises sodium pyruvate and one or more selected from the group consisting of urea and hydroxyethyl urea.

Still another aspect of the present invention provides a brightening composition for an external preparation for skin, which comprises sodium pyruvate and one or more selected from the group consisting of urea and hydroxyethyl urea. The composition for an external preparation for skin in the present invention may be in a formulation such as an ointment, a patch, a gel, a cream, or a spray.

Yet another aspect of the present invention provides a brightening method which comprises treating skin with a composition comprising sodium pyruvate and one or more selected from the group consisting of urea and hydroxyethyl urea.

Yet another aspect of the present invention provides a method of treating pigmentation, which comprises treating skin with a composition comprising sodium pyruvate and one or more selected from the group consisting of urea and hydroxy ethyl urea.

Yet another aspect of the present invention provides a use of a composition comprising sodium pyruvate and one or more selected from the group consisting of urea and hydroxyethyl urea to prepare a brightening cosmetic composition.

Yet another aspect of the present invention provides a use of a composition comprising sodium pyruvate and one or more selected from the group consisting of urea and hydroxyethyl urea to prepare a therapeutic agent for pigmentation.

Yet another aspect of the present invention provides a use of a composition comprising sodium pyruvate and one or more selected from the group consisting of urea and hydroxyethyl urea to prepare an external preparation for skin brightening.

Advantageous Effects

A composition according to the present invention, which comprises sodium pyruvate as an active ingredient, can exhibit a brightening effect due to having an effect of inhibiting melanogenesis of melanocytes. Specifically, when sodium pyruvate is used in combination with one or more of urea and hydroxyethyl urea, a synergistic brightening effect is exhibited, and thus a brightening effect which is not easily obtained when a low concentration of sodium pyruvate is used can be sufficiently exhibited. Also, degradation of the feeling of use of products can be reduced using a low concentration of sodium pyruvate, and it can be used without problems in skin irritation and skin safety unlike other brightening ingredients. Accordingly, the composition of the present invention can be effectively applied in cosmetics, medicines, external preparations, and the like.

DESCRIPTION OF DRAWINGS

FIG. 1 is a graph for confirming the brightening efficacy of sodium pyruvate, urea, and hydroxyethyl urea according to Experimental Example 1.

MODES OF THE INVENTION

Hereinafter, the present invention will be described in detail.

One aspect of the present invention provides a brightening cosmetic composition which comprises sodium pyruvate and one or more selected from the group consisting of urea and hydroxyethyl urea.

Another aspect of the present invention provides a pharmaceutical composition for treating pigmentation, which comprises sodium pyruvate and one or more selected from the group consisting of urea and hydroxyethyl urea.

Still another aspect of the present invention provides a brightening composition for an external preparation for skin, which comprises sodium pyruvate and one or more selected from the group consisting of urea and hydroxyethyl urea.

Yet another aspect of the present invention provides a brightening method and pigmentation treatment method using a composition comprising sodium pyruvate and one or more selected from the group consisting of urea and hydroxyethyl urea, a use of the composition to prepare a brightening cosmetic, a use of the composition to prepare a therapeutic agent for pigmentation, and a use of the composition to prepare an external preparation for skin brightening.

Yet another aspect of the present invention provides a brightening method which comprises treating skin with a composition comprising sodium pyruvate and one or more selected from the group consisting of urea and hydroxyethyl urea.

Yet another aspect of the present invention provides a method of treating pigmentation, which comprises treating skin with the composition Yet another aspect of the present invention provides a use of a composition comprising sodium pyruvate and one or more selected from the group consisting of urea and hydroxyethyl urea to prepare a brightening cosmetic.

Yet another aspect of the present invention provides a use of the composition to prepare a therapeutic agent for pigmentation.

Yet another aspect of the present invention provides a use of the composition to prepare an external preparation for skin brightening.

In the present invention, "sodium pyruvate" is represented by the following Chemical Formula 1 and is another salt form of pyruvic acid which is one of the α-keto acids.

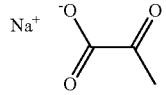

[Chemical Formula 1]

Since pyruvate is an intermediate in several metabolic pathways, sodium pyruvate is widely used to provide more energy in many experiments related to cell culture. According to previous studies, pyruvic acid not only inhibits melasma, solar lentigine, acne, and warts, but also promotes collagen synthesis and enhances skin elasticity. However, since these effects result from the chemical exfoliation of a high concentration (50 to 100%) of pyruvic acid, a stinging or hot sensation may be felt while using pyruvic acid, and may be accompanied by excessive exfoliation or inflammatory blisters.

In the present invention, "urea" is one of the natural moisturizing factors (NMFs) and is capable of imparting an excellent moisturizing effect to the skin. Urea softens the skin, is also called carbamide, and is used as an external preparation for skin due to having keratolytic and antibacterial properties. Depending on the concentration, low-concentration products (10% or less) may be used for xeroderma, and high-concentration products (20 to 40%) may be used as keratolytic agents.

In the present invention, "hydroxyethyl urea" can help maintain moisturizing power and skin elasticity in cosmetics, so it is used in a moisturizer and may also be used as a hair conditioner.

According to the present invention, the problems caused when a high concentration of sodium pyruvate that exhibits melanogenesis inhibitory efficacy is used can be resolved, a brightening effect superior to that when a high concentration is used can be exhibited even when a low concentration of sodium pyruvate is used in combination with one or more selected from the group consisting of urea and hydroxyethyl urea, and a degradation of the feeling of use of a product, which is caused by using a large amount of thickener, can be reduced.

Urea and hydroxyethyl urea by themselves do hardly exhibit a brightening effect. However, when used along with sodium pyruvate, they can enhance the brightening effect of sodium pyruvate.

Specifically, the composition of the present invention comprises all of a combination of sodium pyruvate and urea, a combination of sodium pyruvate and hydroxyethyl urea, and a combination of sodium pyruvate, urea, and hydroxyethyl urea.

The composition may comprise sodium pyruvate in an amount of 0.001 to 2% (w/w) with respect to the total weight of the composition. More preferably, sodium pyruvate may be comprised in an amount of 0.005 to 1% (w/w). Even more preferably, sodium pyruvate may be comprised in an amount of 0.01 to 0.5% (w/w), and most preferably, 0.01 to 0.1% (w/w). When the composition of the present invention comprises sodium pyruvate in an amount of less than 0.001%, a sufficient brightening effect may not be expected. Also, when sodium pyruvate is used along with a thickener, there is a problem of poor formulation stability, but when sodium pyruvate is used along with one or more of urea and hydroxyethyl urea, it is not necessary to excessively increase the concentration for brightening.

The composition may comprise urea in an amount of 0.001 to 5% (w/w) with respect to the total weight of the composition. More preferably, urea may be comprised in an amount of 0.005 to 3% (w/w). Even more preferably, urea may be comprised in an amount of 0.01 to 2% (w/w). When the content of urea does not satisfy the above range, the brightening efficacy of sodium pyruvate may not be sufficiently enhanced, and when a large amount of urea is used, problems such as odor and discoloration may occur due to ammonia gas.

The composition may comprise hydroxyethyl urea in an amount of 0.001 to 10% (w/w) with respect to the total weight of the composition. More preferably, hydroxyethyl urea may be comprised in an amount of 0.005 to 6% (w/w). Even more preferably, hydroxyethyl urea may be comprised in an amount of 0.01 to 4% (w/w). When the content of hydroxyethyl urea does not satisfy the above range, the brightening efficacy of sodium pyruvate may not be sufficiently enhanced, and when a large amount of hydroxyethyl urea is used, a pH in a formulation may be increased to affect formulation stability.

In the present invention, a "skin brightening effect" refers to brightening skin tone by inhibiting the synthesis of the melanin pigment, uniformizing skin tone or complexion, and improving chloasma, melanosis (melasma), freckles, age spots, or melanin pigmentation, which is caused by ultraviolet rays, hormones, or heredity, but the present invention is not limited thereto.

When the composition comprising sodium pyruvate and one or more selected from the group consisting of urea and hydroxyethyl urea is used as a cosmetic, cosmetics containing the above compounds and mixtures as active ingredients may be prepared in the form of a general emulsion formulation or a solubilized formulation. For example, the cosmetics may be in a formulation such as a toner such as a skin softening toner, a nutritional skin toner, or the like, a lotion such as a facial lotion, a body lotion, or the like, a cream such as a nourishing cream, a moisturizing cream, an eye cream, or the like, an essence, a cosmetic ointment, a spray, a gel, a pack, a sunscreen, a makeup base, a liquid-type, solid-type, or spray-type foundation, a powder, a makeup remover such as a cleansing cream, a cleansing lotion, or a cleansing oil, or a cleanser such as a cleansing foam, soap, a body wash, or the like.

In addition, the composition of the present invention may further contain an adjuvant typically used in the field of cosmetics, such as a lipid material, an organic solvent, a solubilizing agent, a concentrate, a gelating agent, an emollient, an antioxidant, a suspending agent, a stabilizer, a foaming agent, a fragrance, a surfactant, water, an ionic emulsifier, a non-ionic emulsifier, a filler, a sequestering agent, a chelating agent, a preservative, a vitamin, a blocking agent, a wetting agent, an essence oil, a dye, a pigment, a hydrophilic active agent, a lipophilic active agent, or a lipid vesicle.

In the present invention, a "pharmaceutical composition" may be administered orally or parenterally, and when the composition comprising sodium pyruvate and one or more selected from the group consisting of urea and hydroxyethyl urea is used as a pharmaceutical composition, it may be administered in a general pharmaceutical formulation, for example, in various oral and parenteral formulations for clinical administration. When formulated, the pharmaceutical composition may be prepared using a diluent or an excipient generally used in the art, such as a filler, an extending agent, a binding agent, a wetting agent, a disintegrant, a surfactant, and the like, but the present invention is not limited thereto.

A solid preparation for oral administration comprises a tablet, a pill, a powder, a granule, a capsule, and the like. Such a solid preparation may be prepared by mixing the pharmaceutical composition of the present invention with at least one or more excipients, for example, starch, calcium carbonate, sucrose or lactose, gelatin, and the like, but the present invention is not limited thereto.

In addition to simple excipient, lubricants such as magnesium stearate, talc, and the like are used. A liquid preparation for oral administration comprises a suspension, a liquid for internal use, an emulsion, a syrup, and the like. In this case, the liquid preparation for oral administration may comprise various excipients, for example, a wetting agent, a sweetening agent, a fragrance, a preservative, and the like, in addition to generally used simple diluents such as water and liquid paraffin, but the present invention is not limited thereto.

A preparation for parenteral administration comprises a sterile aqueous solution, a non-aqueous solvent, a suspension, an emulsion, a lyophilized preparation, a suppository, and the like. As the non-aqueous solvent and the suspension, propylene glycol, polyethylene glycol, a vegetable oil such as olive oil, and an injectable ester such as ethyl oleate may be used. As a base of the suppository, Witepsol, Macrogol, Tween 61, cocoa butter, laurin butter, glycerol gelatin, and the like may be used, but the present invention is not limited thereto.

In the present invention, pigmentation may be one or more selected from the group consisting of chloasma, melanosis (melasma), freckles, age spots, and melanin pigmentation, but the present invention is not limited thereto.

In the present invention, an "composition for an external preparation for skin" may be used as an external preparation for skin, but the present invention is not limited thereto. When the composition comprising sodium pyruvate and one or more selected from the group consisting of urea and hydroxyethyl urea is used as an external preparation for skin, an adjuvant typically used in the field of dermatology, such as a lipid material, an organic solvent, a solubilizing agent, a concentrate, a gelating agent, an emollient, an antioxidant, a suspending agent, a stabilizer, a foaming agent, a fragrance, a surfactant, water, an ionic emulsifier, a non-ionic emulsifier, a filler, a sequestering agent, a chelating agent, a preservative, a vitamin, a blocking agent, a wetting agent, an essence oil, a dye, a pigment, a hydrophilic active agent, lipophilic active agent, a lipid vesicle, and any other ingredients typically used in an external preparation for skin may be further contained. Also, the ingredients may be introduced in an amount generally used in the field of dermatology. When the composition is provided as an external preparation for skin, it may be in a formulation such as an ointment, a patch, a gel, a cream, and a spray, but the present invention is not limited thereto.

Hereinafter, the present invention will be described in detail with reference to the following experimental example. However, the following experimental example is merely presented to exemplify the present invention, and the scope of the present invention is not limited to the following experimental example. Also, the experimental example is provided only to promote understanding of the present invention, and the scope of the present invention is not limited to the experimental example in any sense.

EXAMPLES

Experimental Example 1. Melanogenesis Inhibitory Efficiency Test Results

In order to confirm melanogenesis inhibitory efficacy caused by sodium pyruvate, first, B16F10 cells were dispensed into a 6-well plate at $1 \times 10^5$ cells/well and cultured in a DMEM medium containing 10% FBS and 1% penicillin/streptomycin under conditions of 37° C. and 5% $CO_2$ for 24 hours. Subsequently, the cells were treated with sodium pyruvate and hydroxyethyl urea or urea according to each concentration, as shown in Table 1, along with 10 nM of α-MSH for 48 hours. The resulting cells were harvested, added to 100 μl of a lysis buffer (1N NaOH, 10% DMSO), and then allowed to react at 90° C. for 20 minutes, and melanin amounts were measured at 405 nm (EPOCH, Biotek). The melanin amount measurement results are as follows.

TABLE 1

| Experimental groups | Concentration of each compositional ingredient (wt %) | | | Melanin amount (%) | Melanogenesis inhibitory efficiency** |
|---|---|---|---|---|---|
| | SP* | HEU* | Urea | | |
| Comparative Example 1 | (-) | (-) | (-) | 100 | 0 |
| Comparative Example 2 | (-) | 0.01 | (-) | 100 | *** |
| Comparative Example 3 | (-) | 0.1 | (-) | 100 | *** |
| Comparative Example 4 | (-) | (-) | 0.01 | 100 | *** |
| Comparative Example 5 | (-) | (-) | 0.1 | 100 | *** |
| Comparative Example 6 | (-) | 0.01 | 0.01 | 98 | 2 |
| Comparative Example 7 | (-) | 0.1 | 0.1 | 97 | 3 |
| Comparative Example 8 | 0.01 | (-) | (-) | 92 | 8 |
| Comparative Example 9 | 0.05 | (-) | (-) | 82 | 18 |
| Comparative Example 10 | 0.1 | (-) | (-) | 77 | 23 |
| Comparative Example 11 | 1 | (-) | (-) | 64 | 36 |
| Example 1 | 0.01 | 0.01 | (-) | 83 | 17 |
| Example 2 | 0.01 | (-) | 0.01 | 74 | 26 |
| Example 3 | 0.01 | 0.01 | 0.01 | 60 | 40 |
| Example 4 | 0.1 | 0.1 | 0.1 | 54 | 46 |

*SP: Sodium pyruvate
*HEU: Hydroxyethyl urea
**(Melanin amount upon no treatment − Melanin amount upon treatment)/(Melanin amount upon no treatment) × 100
*** 100 or more has no effect As shown in Table 1, when urea or hydroxyethyl urea was used alone, a melanogenesis inhibitory effect was not shown (Comparative Examples 2, 3, 4 and 5). When both urea and hydroxyethyl urea were used, melanogenesis was inhibited at a very slight level of 3% (Comparative Examples 6 and 7). However, when sodium pyruvate was used together therewith, a melanogenesis inhibitory effect was shown, and it can be seen that urea or hydroxyethyl urea enhanced the brightening efficacy of sodium pyruvate (in the case of Examples 1, 2, 3 and 4, melanogenesis was inhibited at levels of 17%, 26%, 40%, and 46%, respectively). A combination of 0.01 wt % of sodium pyruvate, 0.01 wt % of urea, and 0.01 wt % of hydroxyethyl urea (Example 3) showed an inhibitory efficiency of 40%, which was about 11% higher than 36% shown when 1 wt % of sodium pyruvate was used alone (Comparative Example 11). This means that 100-fold-diluted sodium pyruvate in combination with one or more of urea and hydroxyethyl urea can exhibit a brightening effect similar to that of conventional sodium pyruvate. In addition, a combination of 0.1 wt % of sodium pyruvate, 0.1 wt % of urea, and 0.1 wt % of hydroxyethyl urea (Example 4) showed an inhibitory efficiency of 46%, which was about 27% higher than 36% shown when 1 wt % of sodium pyruvate was used alone (Comparative Example 11).

From these results, it can be seen that, when a low concentration of sodium pyruvate is comprised along with one or more selected from the group consisting of urea and hydroxyethyl urea, a brightening effect superior to that when a high concentration of sodium pyruvate is comprised is exhibited, and thus a sufficient brightening effect can be exhibited even at a low concentration of sodium pyruvate.

The invention claimed is:

1. A composition for skin brightening or skin pigmentation inhibition, comprising sodium pyruvate in combination with urea and/or hydroxyethyl urea, wherein sodium pyruvate is in an amount of 0.01 to 0.5% by weight based on the total weight of the composition, urea is in an amount of 0.01 to 2% by weight based on the total weight of the composition, and hydroxyethyl urea is in an amount of 0.01 to 4% by weight based on the total weight of the composition, and wherein the composition has a synergistic skin brightening effect from the combination of sodium pyruvate and urea and/or hydroxyethyl urea.

2. The composition of claim 1, wherein the sodium pyruvate is comprised in an amount of 0.01 to 0.1 wt % relative to the total weight of the composition.

3. The composition of claim 1 in a formulation of a toner, an essence, a lotion, a cream, a pack, a gel, a powder, a foundation, or a cleanser.

4. The composition of claim 1, wherein the skin pigmentation is one or more selected from the group consisting of chloasma, melanosis, freckles, age spots, and melanin pigmentation.

5. A method for improving skin brightening or inhibiting skin pigmentation, wherein the method comprises applying the composition of claim 1 to the skin of a subject in need thereof.

6. The method of claim 5, wherein the sodium pyruvate is comprised in an amount of 0.01 to 0.1 wt % relative to the total weight of the composition.

* * * * *